United States Patent
Mathew et al.

(10) Patent No.: US 12,098,084 B2
(45) Date of Patent: Sep. 24, 2024

(54) SYSTEMS AND METHODS FOR THE REMOVAL OF MINERALS FROM CONDUCTIVE PROTONIC FLUIDS

(71) Applicant: Dynamic Water Technologies Global, LLC, Scottsdale, AZ (US)

(72) Inventors: Melvin Mathew, Tempe, AZ (US); George Tuan Long Chac, Mesa, AZ (US); Michael Christopher Boyko, Gilbert, AZ (US); Janco Vermeulen, Paradise Valley, AZ (US)

(73) Assignee: Dynamic Water Technologies Global, LLC, Tempe, AZ (US)

( * ) Notice: Subject to any disclaimer, the term of this patent is extended or adjusted under 35 U.S.C. 154(b) by 1040 days.

(21) Appl. No.: 16/999,701

(22) Filed: Aug. 21, 2020

(65) Prior Publication Data
US 2021/0179457 A1 Jun. 17, 2021

Related U.S. Application Data

(63) Continuation-in-part of application No. 16/710,173, filed on Dec. 11, 2019, now abandoned.

(51) Int. Cl.
*C02F 1/48* (2023.01)
*C02F 1/00* (2023.01)
(Continued)

(52) U.S. Cl.
CPC ............... *C02F 1/48* (2013.01); *C02F 1/008* (2013.01); *C02F 1/4678* (2013.01); *C02F 1/52* (2013.01);
(Continued)

(58) Field of Classification Search
CPC .......... C02F 1/46; C02F 1/461; C02F 1/4676; C02F 1/4678; C02F 1/46104;
(Continued)

(56) References Cited

U.S. PATENT DOCUMENTS

| | | | |
|---|---|---|---|
| 3,247,105 A | 4/1966 | Gustafson | |
| 4,169,035 A | 9/1979 | Stummer | |

(Continued)

FOREIGN PATENT DOCUMENTS

| | | | | |
|---|---|---|---|---|
| EP | 2058283 A1 | * | 5/2009 | ............ C02F 1/4602 |
| WO | 2012/150593 A1 | | 11/2012 | |

OTHER PUBLICATIONS

English translation of WO-2019182418 (Year: 2019).*
(Continued)

*Primary Examiner* — Salil Jain
(74) *Attorney, Agent, or Firm* — Law Offices of Damon L. Boyd, PLLC (57) ABSTRACT

Devices, systems and methods for removing minerals from a conductive protonic fluid and creating oxidizers therein. A non-alternating flow of electrons in a conductive protonic fluid selectively precipitates hardness causing heavy minerals from the fluid. The decrease in hardness causing minerals leads to the protonic fluid moving towards a thermodynamic equilibrium that prevents precipitation of the noted hardness causing minerals. By-products from the process, like halogens, help oxidize other minerals and treat bio-life within the source. Systems include a vessel containing the conductive protonic fluid, a conductive protonic fluid flow mechanism, a power supply, a control mechanism, and one or more reaction chambers. The reaction chamber has at least one reaction chamber wall having a conductive surface and a conductive element. The power supply provides an electric field to the conductive protonic fluid in the reaction chamber such that the conductive surface and the conductive element have opposing charges which separate the conductive protonic fluid into negative and positive ions creating an ion gradient between the conductive element and conductive surface, resulting in a pH gradient between the conductive surface and the conductive element, thereby enhancing (Continued)

precipitation of the minerals on a positive end of the ion gradient.

17 Claims, 4 Drawing Sheets

(51) Int. Cl.
    *C02F 1/461*     (2023.01)
    *C02F 1/467*     (2023.01)
    *C02F 1/52*     (2023.01)
    *C02F 101/10*     (2006.01)
    *C02F 103/02*     (2006.01)

(52) U.S. Cl.
    CPC ............. *C02F 2001/46171* (2013.01); *C02F 2101/10* (2013.01); *C02F 2103/023* (2013.01); *C02F 2201/48* (2013.01); *C02F 2209/055* (2013.01); *C02F 2209/06* (2013.01)

(58) Field of Classification Search
    CPC ............. C02F 1/46109; C02F 1/4618; C02F 2001/46152; C02F 2001/46171; C02F 2001/46185; C02F 2001/4619; C02F 2001/46195; C02F 2209/055; C02F 2303/22
    See application file for complete search history.

(56) References Cited

U.S. PATENT DOCUMENTS

| | | | | |
|---|---|---|---|---|
| 4,440,616 | A * | 4/1984 | Houseman | C25C 7/00 204/272 |
| 5,256,268 | A * | 10/1993 | Goto et al. | |
| 5,944,979 | A | 8/1999 | Lefebvre | |
| 6,235,186 | B1 * | 5/2001 | Tanaka | C02F 1/4674 205/521 |
| 7,374,656 | B2 | 5/2008 | Elgressy | |
| 7,638,031 | B2 | 12/2009 | Elgressy | |
| 8,459,275 | B2 | 6/2013 | Smith et al. | |
| 9,421,586 | B2 | 8/2016 | Smith et al. | |
| 10,246,666 | B2 | 4/2019 | Solomon et al. | |
| 2005/0173242 | A1 | 8/2005 | Elgressy | |
| 2005/0189236 | A1 * | 9/2005 | Polnicki | C02F 1/46109 205/687 |
| 2005/0230268 | A1 | 10/2005 | Elgressy | |
| 2006/0273470 | A1 | 12/2006 | Takahashi et al. | |
| 2007/0138104 | A1 | 6/2007 | Elgressy | |
| 2008/0115925 | A1 | 5/2008 | Hibino et al. | |
| 2010/0078389 | A1 | 4/2010 | Elektorowicz et al. | |
| 2011/0168567 | A1 | 7/2011 | Smith et al. | |
| 2014/0183109 | A1 | 7/2014 | Sherzer | |
| 2014/0231348 | A1 * | 8/2014 | Sackstein | C02F 1/32 422/186.04 |
| 2014/0273243 | A1 | 9/2014 | Kahaian et al. | |
| 2014/0296140 | A1 | 10/2014 | Johnson et al. | |
| 2015/0191369 | A1 * | 7/2015 | Kirman | C02F 1/66 205/746 |
| 2015/0203384 | A1 * | 7/2015 | Eda | C02F 1/5281 210/96.1 |
| 2021/0253452 | A1 * | 8/2021 | Horne | B01F 25/43161 |

OTHER PUBLICATIONS

May 21, 2021, PCT Written Opinion of the International Searching Authority re International Application No. PCT/IB2020/061712.
May 21, 2021, PCT International Search Report re International Application No. PCT/IB2020/061712.
Muddemann, et al. "Electrochemical Reactors for Wastewater Treatment." ChemBioEng Reviews 6.5 (Oct. 3, 2019): 142-156.
Elgressy Engineering Services Ltd., Chemical Free Water Treatment brochure, date unknown, some brochure information available at www.elgressy.com.
Wheatley, Sidestream Condenser Precipitator Yields Energy and Water Savings, article printed from www.coolingbestpractices.com on Nov. 14, 2017.
ElectroCell Systems, The Technology, pages containing information on electrostatic treatment, date unknown, some information may be found at www.electrocellsystems.com.
Non-Final Office Action dated Jan. 30, 2020 in U.S. Appl. No. 16/710,173.
Apr. 6, 2020 Reply to Non-Final Office Action dated Jan. 30, 2020 in U.S. Appl. No. 16/710,173.
Final Office Action dated Apr. 22, 2020 in U.S. Appl. No. 16/710,173.
Examiner Interview Summary dated Jun. 8, 2020 in U.S. Appl. No. 16/710,173.
Jun. 22, 2020 Reply to Final Office Action dated Apr. 22, 2020 in U.S. Appl. No. 16/710,173.
Advisory Action dated Jun. 29, 2020 in U.S. Appl. No. 16/710,173.
AFCP 2.0 Decision dated Jun. 29, 2020 in U.S. Appl. No. 16/710,173.

* cited by examiner

SYSTEMS AND METHODS FOR THE REMOVAL OF MINERALS FROM CONDUCTIVE PROTONIC FLUIDS

CROSS-REFERENCE TO RELATED APPLICATIONS

The present application claims priority to U.S. patent application Ser. No. 16/710,173 filed on Dec. 11, 2019, entitled "SYSTEMS AND METHODS FOR THE REMOVAL OF MINERALS FROM CONDUCTIVE PROTONIC FLUIDS," the entire disclosure of which is incorporated by reference herein.

FIELD OF THE INVENTION

The invention relates to the removal of hardness causing minerals from conductive protonic fluids and the creation of oxidizing biocides in such fluids.

BACKGROUND

When using a solution such as water to cool a process, much of the energy rejected by the process is dissipated by evaporation of the solution. For example, cooling towers and other heat exchangers are common applications of such cooling. As water is lost due to evaporation, the loss of water is supplemented by the addition of new water to the system.

This consistent cycle of evaporation and supplementation with new water presents various issues. For example, water that is evaporated does not carry with it the minerals it carried when added to the system. Thus, as water evaporates, minerals accumulate in the solution. This continued accumulation of minerals or "hardness" in the solution can be detrimental to the overall thermodynamic efficiency and balance of the system. For example, the increased concentration of hardness causing minerals such as calcium, magnesium, silica, transition metals, and the like, can lead to destabilization of these minerals and their subsequent precipitation (scale) on solid surfaces of the system.

This issue can be exacerbated when the temperature of the solution increases. For example, solutions such as water used in heat transfer applications or water distribution networks (e.g., gland water systems) are typically exposed to consistently high temperatures. This coupled with the inverse solubility of scale causing minerals like calcium to scale by destabilizing from the solution and adhere to the solid surfaces in contact with the solution. These surfaces can be the heat exchanger surfaces as well as other low flow zones in the system. The minerals that adhere to such surfaces are a primary cause of reduced heat transfer efficiency in cooling systems and reduced flow of coolants through pipes and tubes.

A variety of prior art systems attempt to remove minerals from the water in cooling systems. However, the efficacy of these systems can be adversely impacted by a number of factors. For example, as the flow of mineral rich water through the mineral removal systems increases, so does the turbulence of the water, which drives the efficacy of mineral removal down. Similarly, the configuration of the structure of the mineral removal system can also contribute to turbulence and the corresponding decrease in efficacy. For example, "vat" systems with multiple components within them (e.g., conductive electrodes) can interfere with the flow of the water and increase turbulence. Moreover, existing systems with multiple conductive elements therein do not have uniform pH gradients therein, which can cause non-uniform build-up of precipitating minerals and again, lower the efficacy of the system. Further still, systems with only a single, longer and narrower treatment vessel do not address this deficiency as they cannot accommodate the high flow rates required in large cooling systems because again, as the flow rates through such vessels increases, so too does turbulence.

Moreover, scale formations on the cooling and piping surfaces can be difficult to remove and may require the use of aggressive corrosive acids to remove them. This maintenance process is costly, dangerous to personnel, raises safety, health and environmental (SHE) issues, and potentially damaging to the cooling system. Additionally, these cleaning processes require that the equipment be shut down, reducing the overall efficiency of all process associated with the cooling system. It is thus desirable to avoid spending time, money and other resources on such maintenance and instead seek preventative maintenance that reduces or prevents this scaling in the system in the first place.

Some attempts at preventative maintenance include treating the water in cooling or water distribution systems by introducing various chemicals to the system. Such chemicals include oxidizing and non-oxidizing biocides, corrosion inhibitors, and scale inhibitors. Biocides are used to control bio-contamination by bio-life such as algae, bacterial strains, fungi, and viruses. Indeed, a primary concern in present-day bio-treatment of cooling towers is the control of legionella virus and the resulting Legionnaire's disease. Additionally, scale inhibitors are used in attempts to prevent hardness causing minerals from destabilizing from the bulk volume and precipitating. Corrosion inhibitors are also employed in attempts to prevent the solution from dissolving metals from the heat transfer surfaces and piping present in the cooling system.

The forgoing chemicals are typically introduced using positive pressure chemical discharge pumps that are controlled and monitored using a control system. The chemicals are fed into the bulk water flow of the cooling system and solubilize in the bulk water. However, the introduction of these chemicals presents various challenges. For example, the use of oxidizing biocides can cause physical injuries due to mishandling and leaks. The oxidizing biocides can also accelerate corrosion of the metals that form the various structural components of the cooling systems. Non-oxidizing biocides do not cause corrosion but are typically more toxic to human health and raises safety and environmental risks.

Scale control in cooling systems are often done by utilizing scale inhibitors based on phosphor-based compounds. These scale inhibitors increase the solubility of hardness causing minerals in the bulk of the fluid body. The controllers used for feeding these chemicals are not usually controlled in real-time. Rather, they are retroactively controlled by human intervention at regular intervals of time. During the period between two such interventions, the controller can "overfeed" or "underfeed" the inhibitor into the fluid body. Overfeeding these inhibitors does not generally lead to any direct scaling issues on the heat exchange surfaces but the discharge fluid from these bodies can have significant amounts of phosphorous-rich chemicals that need to be processed at an onsite or off-site water treatment facility. On the other hand, underfeeding inhibitors can lead to uncontrolled and unexpected scaling of heat exchange surfaces.

Thus, improved systems and methods of removing hardness causing minerals from conductive protonic fluids and the creation of biocides in such solutions is desirable.

SUMMARY OF THE INVENTION

In accordance with various non-limiting and exemplary embodiments, the present disclosure comprises devices, systems and methods for removing minerals from a conductive protonic fluid and creating oxidizers therein. The system uses a non-alternating flow of electrons in a conductive protonic fluid to selectively precipitate hardness causing heavy minerals from the fluid. The decrease in hardness causing minerals leads to the protonic fluid moving towards a thermodynamic equilibrium that prevents precipitation of the noted hardness causing minerals. By-products from the process, like halogens, can help oxidize other minerals and treat bio-life within the source.

For example, various exemplary embodiments of the present disclosure comprise devices, systems and methods for removing minerals from a conductive protonic fluid and creating oxidizers therein that include a vessel containing the conductive protonic fluid, a conductive protonic fluid flow mechanism, a power supply, a control mechanism, and one or more reaction chambers. The reaction chamber may comprise a reaction chamber wall having a conductive surface and a conductive element within the reaction chamber. The conductive protonic fluid is supplied from the vessel to the reaction chamber and back to the vessel by the conductive protonic fluid flow mechanism. The power supply provides an electric field to the conductive protonic fluid in the reaction chamber such that the conductive surface and the conductive element have opposing charges which separate the conductive protonic fluid into negative ions and positive ions creating an ion gradient of negative ions to positive ions between the conductive element and the conductive surface, resulting in a pH gradient between the conductive surface and the conductive element, thereby enhancing precipitation of the minerals on a positive end of the ion gradient.

BRIEF DESCRIPTION OF THE DRAWINGS

The accompanying drawings provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Persons skilled in the art will readily appreciate that various aspects of the present invention may be realized by any number of methods and apparatuses configured to perform the intended functions. Stated differently, other methods and apparatuses may be incorporated herein to perform the intended functions. It should also be noted that the accompanying drawing figures referred to herein are not all drawn to scale, but may be exaggerated to illustrate various aspects of the present invention, and in that regard, the drawing figures should not be construed as limiting. Finally, although the present invention may be described in connection with various principles and beliefs, the present invention should not be bound by theory.

The above being noted, in accordance with various aspects of the present disclosure, systems and methods disclosed herein use a non-alternating flow of electrons in a conductive protonic fluid to selectively precipitate hardness causing minerals (e.g., magnesium, calcium, barium, strontium and the like) from the fluid. The decrease in hardness causing minerals leads to the protonic fluid moving towards a thermodynamic equilibrium that prevents the precipitation of above-mentioned hardness causing minerals. Moreover, byproducts of the systems, such as various halogens, can help oxidize other minerals and treat bio-life within the source.

The non-alternating flow of electrons may be generated by any now known or as yet unknown power source, including, for example, galvanic cells, solar cells, DC generators, rectifiers connected to an alternating source of current, and other similar sources.

The conductive protonic fluid can be from any source, and further, may be a continuous, semi-batch, or batch source. The fluid flows from the source to the electrochemical reaction chamber using either gravitational forces or mechanical pumping devices.

In accordance with various aspects of the present disclosure, systems and methods disclosed herein use the electrochemical reaction chamber to selectively precipitate hardness causing minerals from the fluid by electrically forcing an active pH gradient within the reaction chamber that is maintained using a controlled non-alternating electric field. The electric field activates the conductive protonic fluid to create protons, thereby creating a pH of about 0.0 near a negatively charged electrode (anode) within the reaction chamber, while non-protonic components collect near the positively charged electrode (cathode) and create a pH of about 14.0, with a pH gradient between the anode and the cathode.

In accordance with various aspects of the present disclosure, the pH gradients disclosed herein generally have a profile that is similar to the profile of the reaction chamber. For example, with reference to FIG. 3, where each line 136 is a reference in the gradient, in an elliptical reaction chamber, the pH gradient is similarly elliptical (i.e., an "elliptical pH gradient"). Because the profiles are similar, the precipitation of the minerals is more uniform, and the overall efficacy of the system is increased.

The alkaline pH regions in the reaction chamber attract the hardness causing minerals of the protonic fluid. These hardness causing minerals are destabilized by the higher concentrations of hydroxyl ions created in these regions and can be selectively removed from the protonic fluid, for example, through precipitation and/or mechanical separation. In the acidic pH regions of the reaction chamber, halogen elements are activated by electrons in the electric field to create gaseous halogens. Such halogens are strong oxidizers and can be used to oxidize more heavy minerals in the fluid, leading to secondary hardness or heavy metal removal. Moreover, these halogens can act as potent biocides for disinfection of the fluid.

More specifically, an electrochemical reaction such as described above using the non-alternating current results in the following electrochemical reaction:

$$H_2O + e^- \rightarrow H^+ + OH^-$$

The protonic nature of the liquid creates hydrogen ions and induces a pH of 0. The non-protonic components of the liquid (e.g., carbonates and other alkaline materials, hydroxyls, and positively charged metal complexes) accumulate at the cathode to and create a pH of about 14. This pH difference within the unit will create a forced pH gradient from the anode to cathode and in areas where the pH is greater than about 7, the solubility of the heavy ionic minerals in the protonic fluid source will destabilize and the minerals will aggregate as larger masses and attach to the cathodic surface, removing them from the fluid. Moreover, the accumulation of heavy ionic minerals within the system may further act to trap silica and other non-ionic minerals as a physical complex bound by non-chemical bonds of attraction.

In accordance with various aspects of the present disclosure, the fluid exiting the reaction chamber can be passed through further processing mechanisms such as solid capture systems including, for example, secondary settling tanks, clarifiers, sieves, or weirs to remove additional insoluble destabilized mineral masses generated as a part of the electrochemical treatment process.

The fluid that returns to the source from the reactions chamber(s) and any further processing steps is thus reduced in hardness causing minerals, metals, and their alloys.

As noted above, in accordance with various aspects of the present disclosure, the electrochemical reaction can generate gaseous halides as a by-product as follows:

$$2X^- - 2e^- \rightarrow X_2$$

The gaseous halogen generated as a byproduct from the electrochemical reaction can be used as an oxidizer within the protonic fluid. In accordance with various aspects of the present disclosure, the generation of the above-mentioned halogen may be a gaseous chlorine, and its creation can be further accelerated by decreasing the flowrate through the reactor by up to about 95% of an initial flowrate.

Additionally, in accordance with various aspects of the present disclosure, because the electrochemical reaction will cease when the source of non-alternating current is deactivated, the reaction and process can be controlled by monitoring and turning the reaction on and off and/or increasing and decreasing the power as desired.

The above being noted, with reference now to the Figures attached hereto, various non-limiting examples of systems and methods in accordance with present disclosure are described. For example, with reference to FIGS. 1 and 2, a system 100 for the removal of minerals from a conductive protonic fluid (or simply, "fluid") 110 is illustrated. The system 100 may comprise a vessel 120 containing the conductive protonic fluid 110 and at least one reaction chamber 130 for containing an electrochemical reaction such as referenced above which removes minerals from the fluid. Additional, new fluid 110 may be intermittently or continuously added to the vessel 120 during operation. As noted above, the electrochemical reaction in the reaction chamber 130 may also create oxidizing ions that act as biocides. Exemplary oxidizers include free halides, sodium hypochlorite, hypobromous acid, and hypochlorous acid which control biologic materials by destroying the cell walls and internal organelles of such biologic materials.

Figure 1:
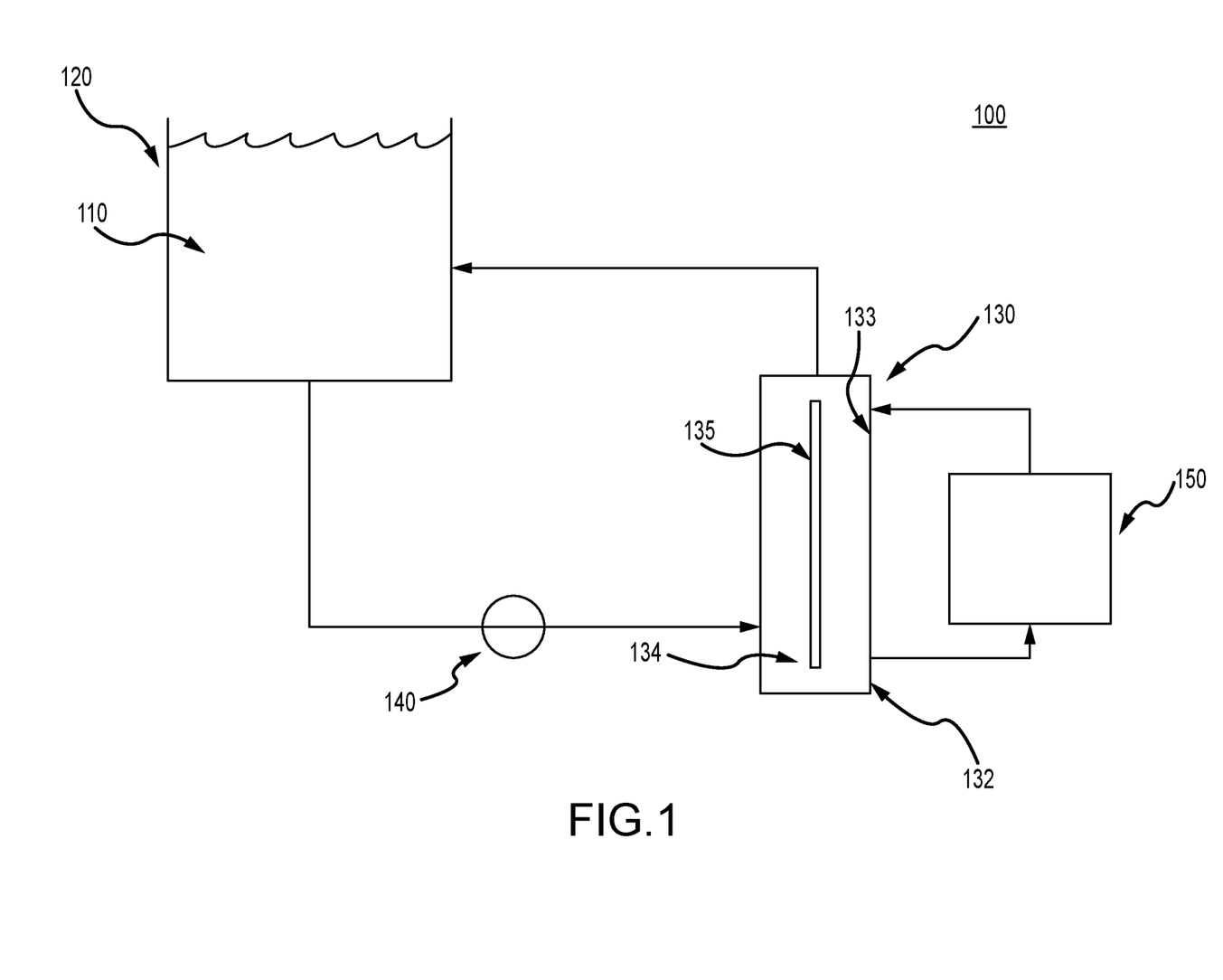
FIG. 1 is an exemplary embodiment of a system for the removal of minerals from a conductive protonic fluid.
Figure 2:
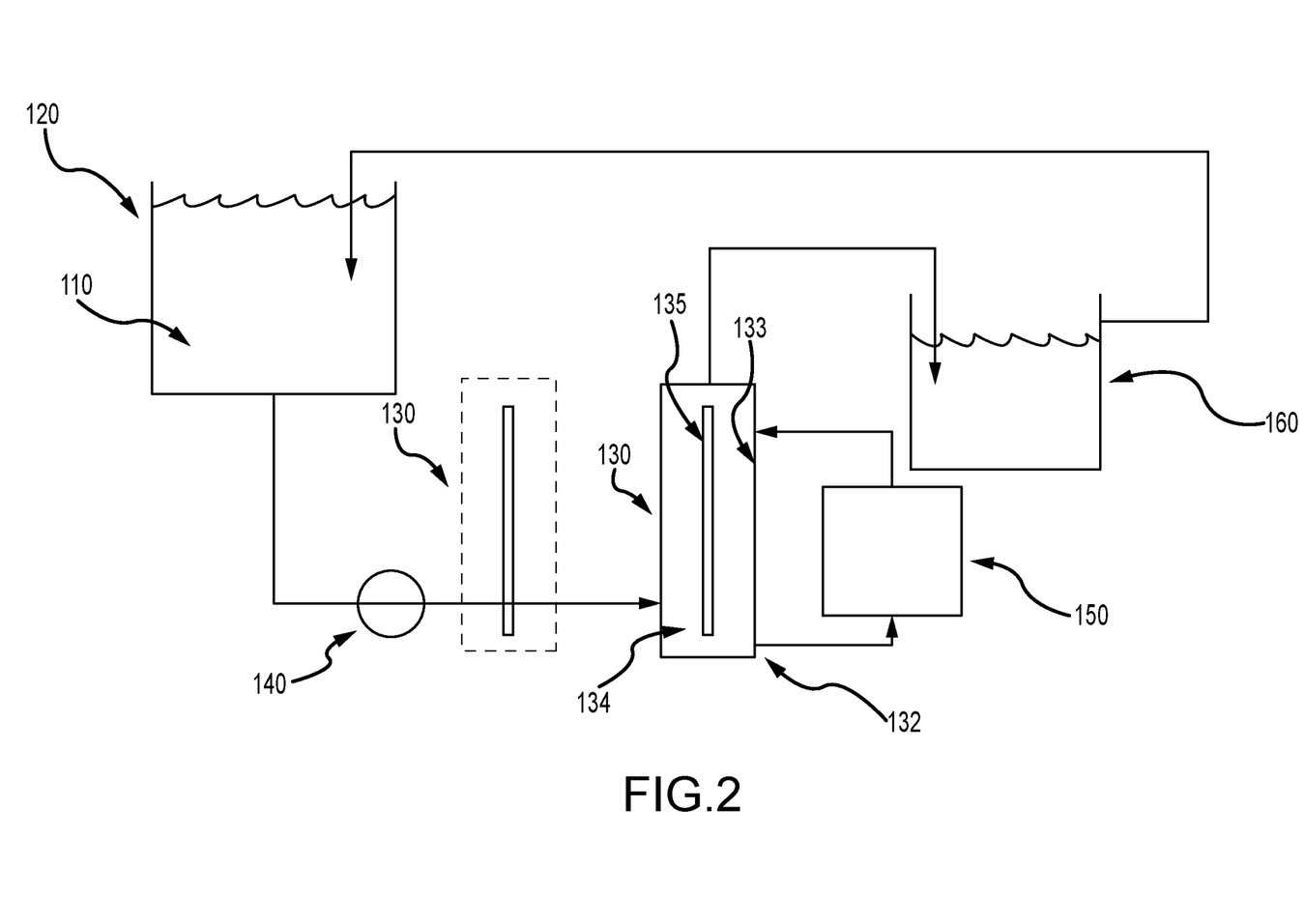
FIG. 2 is another exemplary embodiment of a system for the removal of minerals from a conductive protonic fluid including a solids capture system and optional, additional reaction chambers.

In accordance with the present disclosure, the generation of oxidizing biocides is due to the electrochemical activation of chlorides, bromides and similar halides in the fluid 110. Since, chlorides are the primary halide present in most fluids, hypochlorous acid and its derivatives act as the primary sources of bio-treatment when using the system 100. The level of chlorides in the initial fluid directly impacts the amount of hypochlorous acid generated. For example, in contrast to applications where the removal of chlorides is desirable (e.g., the processing of drinking water), a minimum of about 150 ppm of chlorides is required for initiating the generation of hypochlorous acid in the system, though an initial concentration for chlorides of about 250 ppm is preferred, and concentrations above about 500 ppm are most preferable for complete disinfection of the source and for generating free chlorine concentrations greater than about 0.1 ppm in the water source. However, the greater the amount of chlorides in the fluid, the greater the chances of stress cracking and erosion corrosion in stainless steel used in many water systems. Thus, a maximum concentration of about 1500 ppm of chlorides in the water source is the preferred upper limit so as to avoid accelerating stainless steel and mild steel corrosion.

The system 100 generates the electrochemical reactions contemplated herein by using a non-alternating current provided by, for example, any now known or as yet unknown DC power supply.

In accordance with various aspects of the present disclosure, the fluid 110 is moved through the system 100, for example, from the vessel 120 to the reaction chamber 130 and back to the vessel 120 (and any intermittent steps), via a fluid flow mechanism 140. In accordance with various aspects, the fluid 110 may be moved by gravity or other mechanical pump 140 or combinations of multiple pumps and/or gravity. The pump 140 may be powered by the aforementioned DC power supply or alternative source of power. In accordance with various aspects of the present disclosure, the flowrate of the fluid 110 is at least about 10% of the net flow of a source of new conductive protonic fluid entering the vessel 120.

In accordance with various aspects of the present disclosure, the system 100 further comprises at least one reaction chamber 130 for containing the electrochemical reactions described herein. The reaction chamber 130 may be of any suitable size, shape and profile depending on the application. For example, in some embodiments, the reaction chamber 130 may have an elliptical profile, such as circular (the major and minor diameters of the elliptical shape are the same) or ovoid (the major and minor diameters of the elliptical shape are different), though other angular profiles and shapes also fall within the scope of the present disclosure. That being said, elliptical reaction chambers maximize the cross-sectional profile of the reaction chamber and may be preferable. In accordance with various alternative aspects of the present disclosure, the system may comprise, optionally, multiple reaction chambers 130, depending on the application and desired parameters of the same.

In accordance with various aspects of the present disclosure, the reaction chamber 130 may have a length-to-diameter ratio between about 4:1 to about 30:1, more preferably between about 5:1 to about 10:1, and most preferably between about 6:1 and about 8:1. For example, in an embodiment, the reaction chamber has a length of about 38 inches and a major diameter of about 6 inches, resulting in a length-to-diameter ratio between about 6.3:1.

Figure 4:
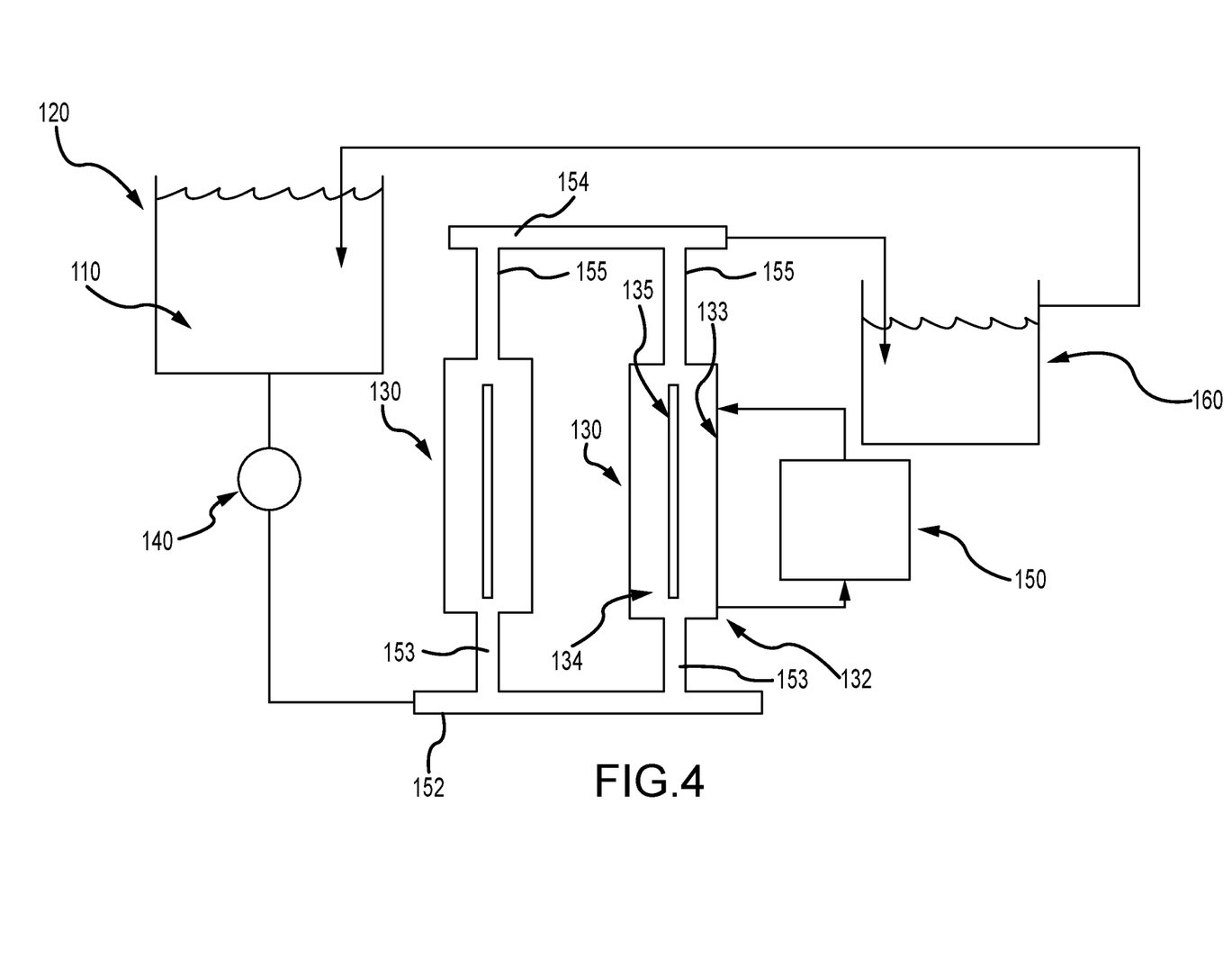
FIG. 4 is another exemplary embodiment of a system for the removal of minerals from a conductive protonic fluid including additional reaction chambers and first and second manifolds.

In accordance with various aspects of the present disclosure and with reference to FIG. 4, multiple reaction chambers 130 may be connected in parallel by a first manifold 152 and a plurality of feed pipes 153. The first manifold 152 is at either an inlet of each reaction chamber 130 and first separates and distributes the fluid 110 into each reaction chamber 130, uniformly or at different flow rates. In some embodiments, a second manifold 154 may be provided at an outlet 155 of each reaction chamber to combine the fluid 110 leaving each reaction chamber 130 into a single conduit. After passing through the reaction chambers 130 and the second manifold 154 (when present), the fluid 110 is returned to the vessel 120 via a return pipe. The flow into each reaction chamber 130 may be controlled by now known or as yet unknown flow control mechanisms, such as pumps, valves and the like, that may be controlled by various digital or analog control mechanisms. By providing multiple reaction chambers 130 and controlling the flow through each, the overall aggregate flow rate through all reaction chambers 130 may be increased, while at the same time keeping the flow rate through any individual reaction chamber 130 lower. This lower flow rate maintains the Reynold's number within the reaction chamber 130 between about 20,000 and about 80,000. By maintaining the Reynolds number between this range, turbulence in that reaction chamber 130 may be reduced, along with the corresponding reduction in efficacy an increase in turbulence would otherwise cause.

For example, in accordance with one embodiment, a reaction chamber 130 having a length of about 38 inches and a diameter of about 6 inches with a flow rate of about 6,100 in$^3$ per minute has a Reynolds number of about 26,100, within the above-noted 20,000 to about 80,000 Reynolds number range.

Figure 3:
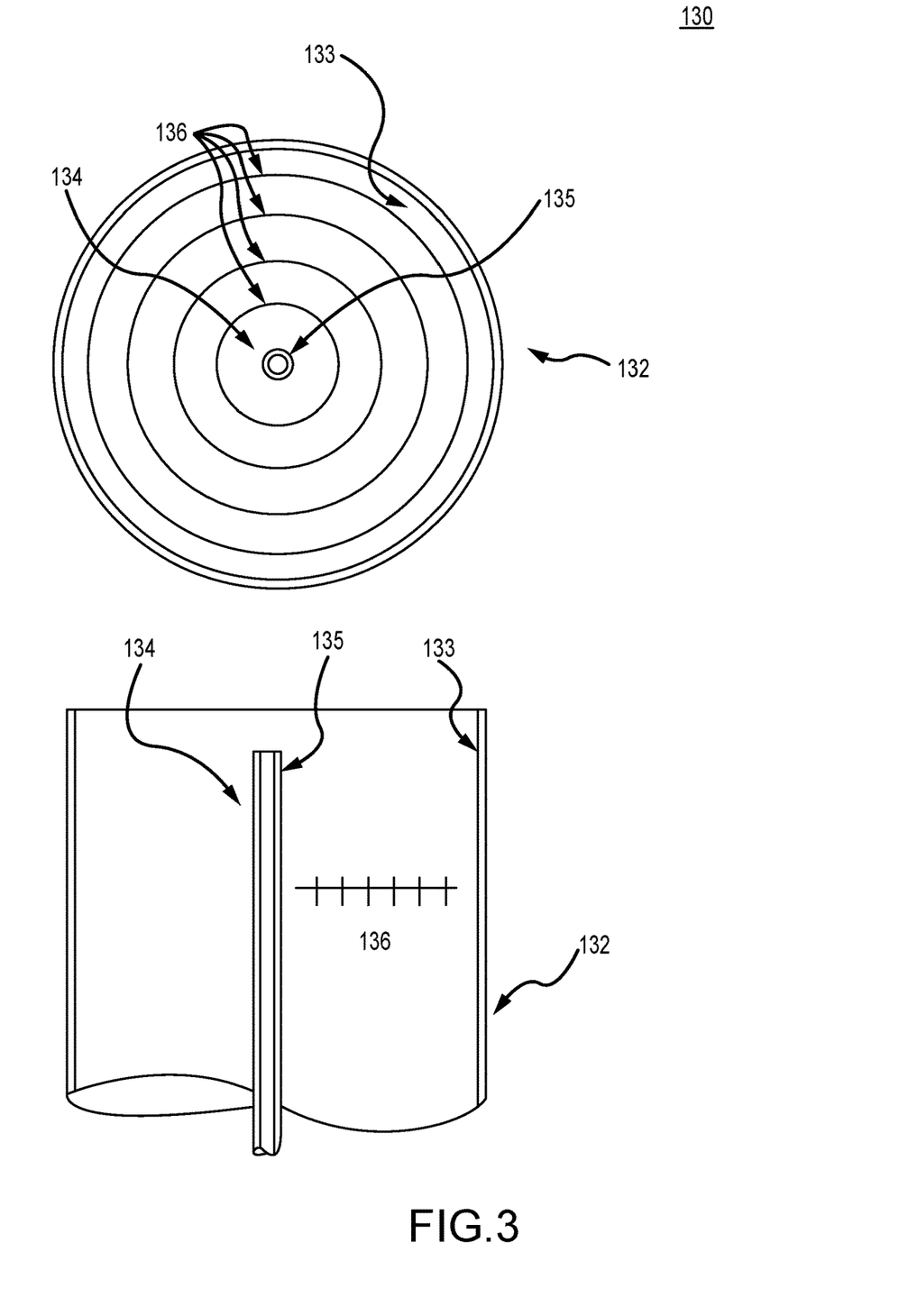
FIG. 3 are cross-sectional top and front views of an exemplary embodiment of a reaction chamber of a system for the removal of minerals from a conductive protonic fluid.

With reference to FIGS. 1-3, the reaction chamber 130 comprises at least one reaction chamber wall 132. The reaction chamber wall 132 may have a conductive surface 133 either applied to the reaction chamber wall 132 or which is the material of the reaction chamber wall 132 itself. Exemplary materials that comprise the conductive surface 133 include iron, mild steel, stainless steel, or any other conductive metallic surface, and their conductive alloys and the like. The conductive surface 133 in accordance with the present disclosure is a cathodic conductive surface. The conductive surface 133 may have an internal surface area of between about 290 in$^2$ and 1550 in$^2$, more preferably between about 300 in$^2$ and 900 in$^2$, and most preferably between about 615 in$^2$ and about 780 in$^2$, though other surfaces areas fall within the scope of the present disclosure. For example, in an embodiment where the reaction chamber has a length of about 38 inches and is circular and has a major diameter of about 6 inches, the resulting internal surface area is about 716 in$^2$.

In accordance with various aspects of the present disclosure, the reaction chamber further comprises a conductive element 134 within the reaction chamber 130. Any suitably conductive material may be used for the conductive element 134, but one example includes a conductive element 134 comprised of titanium. In accordance with various aspects of the present disclosure, the conductive element 134 may also have a conductive coating 135, such as for example, iridium, titanium, ruthenium, rhodium, palladium, and/or platinum, as well as combinations and alloys of the same, as well as other suitably conductive coatings. Such coatings are more durable in the low pH conditions experienced within the reaction chamber 130, though any conductive metal that is solid at the ambient operating conditions of the reaction chamber 130 may be used. The conductive element 134 and/or conductive coating 135 in accordance with the present disclosure is an anodic conductive element.

In accordance with various aspects of the present disclosure, Preferably, the reaction chamber 130 and the conductive element 134 are at least about two feet or greater in length, with the conductive element 134 having a length preferably between about 50% and about 100%, more preferably between about 70% and 100%, and most preferably between about 90% and 100% of the length of the reaction chamber wall 132.

As presently described, the conductive element 134 is generally cylindrical and runs axially through an approximate center of the reaction chamber 130, and the radial distance between the conductive element 134 and the conductive surface 133 are about 3 inches apart, though the conductive element 134 need not be circular nor centrally located, and the distance apart may vary depending on the size and specifications of specific applications of the system 100. For example, the radial distance between the conductive element 134 and the conductive surface 133 may be between about 1 inch and about 5 inches, more preferably between about 2 inches and 4 inches, and most preferably between about 2.5 inches and 3 inches.

By maintaining a single conductive element 134 axially and through an approximate center of each reaction chamber 130, turbulence in that reaction chamber 130 is minimized along with the corresponding reduction in efficacy such turbulence causes. Similarly, by maintaining a single conductive element 134 axially and through an approximate center of each reaction chamber 130, the profile of the pH gradient and reaction chamber wall 132 are similar, and thus the precipitation of the minerals is more uniform and the overall efficacy of the system is increased.

As noted above, in accordance with various aspects of the present disclosure, the conductive protonic fluid 110 may be supplied from the vessel 120 to the reaction chamber 130 and back to the vessel 120 by a pump 140. Additional pumps may be provided as needed depending on flow requirements. As the fluid 110 flows through the reaction chamber 130, the DC power supply creates an electric field in the fluid 110 in the reaction chamber 130 such that the conductive surface 133 and the conductive element 134 (or the conductive coating 135) have opposing charges. The opposing charges separate the fluid into negative ions and positive ions as noted above and as follows:

$$H_2O + e^- \rightarrow H^+ + OH^-$$

thereby creating an ion gradient of negative ions to positive ions between the conductive element 134 and the conductive surface 133, resulting in a pH gradient between the conductive element 134 and the conductive surface 133, thereby creating or enhancing precipitation of the minerals proximate the positive end of the ion gradient. The ion gradient is negative proximate the conductive element 134 and positive proximate the conductive surface 133, and thus the pH of the conductive protonic fluid 110 is about 0 proximate the conductive element 134 and greater than about 7 proximate the conductive surface 133, with the pH gradient therebetween. In accordance with various aspects, the pH of the conductive protonic fluid 110 is greater than about 11 proximate the conductive surface 133, and preferably closer to 14.

In accordance with various aspects of the present disclosure, the system 100 further comprises a control mechanism 150. The control mechanism 150 can monitor and control various aspects and parameters of the system 100, including activation and deactivation of the electric field and changing its voltage, as well as the parameters of the fluid 110 such as flow rates, temperature and the composition of the fluid 110.

For example, the control mechanism 150 may monitor a Total Hardness Deficit of the fluid 110 by performing a real-time spectrometric analysis of a sample of the fluid 110 during predetermined intervals of time. The intervals can be set on a timer within a control mechanism 150 that activates the sampling and testing sequence of steps. In accordance with one aspect of the present disclosure, the time between testing is about thirty minutes, though in accordance with alternative aspects, a test can be done every six hours. Other intervals are within the scope of the present disclosure as well, depending on the particular application.

The fluid can be injected with a colorant in a testing container within the control mechanism 150. The colorant is reactive to hardness causing minerals. The concentration of hardness causing minerals is calculated using a beam of light of about 610 nm wavelength. The intensity of the refracted beam through the sample solution will indicate the concentration of silica in the fluid. The control mechanism 150 will then maintain the Total Hardness Deficit above about 5%, for example by adjusting parameters of the system 100 such as increasing or decreasing the flow rate of the fluid into the reaction chamber 130 and/or the voltage of the electric field, and thus, the concentration of selected hardness causing minerals. In accordance with various aspects of the present disclosure, the Total Hardness Deficit may be defined by the following equation:

$$\text{Total Hardness Deficit} = [(\text{Total Hardness in the Effluent Fluid}) - (\text{Total Hardness in the Influent Fluid})]/(\text{Total Hardness in the Influent Fluid})$$

In accordance with various aspects of the present disclosure, the control mechanism 150 can monitor a silica deficit of the fluid 110 by performing a real-time spectrometric analysis of the fluid sample every predetermined interval of time. The interval will be set on a timer within the control mechanism 150 that activates the sampling and testing sequence of steps. In accordance with one aspect of the present disclosure, the time between testing is about thirty minutes, though in accordance with alternative aspects, one test can be done every six hours. The fluid can be injected with a colorant in a testing container within the control mechanism 150. The colorant is reactive to dissolved silica. The concentration of dissolved silica is calculated using a beam of light of 610 nm wavelength. The intensity of the refracted beam through the sample solution will indicate the concentration of silica in the fluid. The control mechanism 150 will then maintain the silica deficit greater than about 5%, for example, by adjusting parameters of the system 100 such as increasing or decreasing the flow rate of the fluid into the reaction chamber 130 and/or the voltage of the electric field, and thus, the concentration of selected the concentration of silica in the vessel. In accordance with various aspects of the present disclosure, the silica deficit may be defined by the following equation:

$$\text{Silica Deficit} = [(\text{Silica in the Effluent Fluid}) - (\text{Silica in the Influent Fluid})]/(\text{Silica in the Influent Fluid})$$

In accordance with various aspects of the present disclosure, the control mechanism 150 can monitor the Langelier Saturation Index (LSI) of the conductive protonic fluid and maintain the LSI at about 1.0 by adjusting parameters of the system 100 such as temperature, increasing or decreasing the flow rate of the fluid into the reaction chamber 130, the voltage of the electric field, and thus the concentration of at least one hardness causing mineral. In accordance with various aspects of the present disclosure, the silica deficit may be defined by the following equation:

$$\text{LSI} = \text{pH} - \text{pH}_s$$

Where, $\text{pH}_s = (9.3 + A + B) - (C + D)$
$A = (\log_{10}(\text{TDS}) - 1)/10$
$B = (-13.12 * \log_{10}(°C. + 273)) + 34.55$
$C = \log_{10}(\text{Ca}^{2+} \text{ as CaCO}_3) - 0.4$
$D = \log_{10}(\text{Alkalinity as CaCO}_3)$ In accordance with various aspects of the present disclosure, the control mechanism 150 can monitor an effective amperage applied across the electric field in the reaction chamber 130 and maintain the effective amperage above about 1.0 Amperes by adjusting parameters such as the voltage and the concentration of conductive minerals in the fluid 110, for example, by dilution or concentration of the fluid 110 coming from the vessel 120.

As noted above, in accordance with various aspects of the present disclosure, the system 100 can create oxidizing ions in a region proximate the anodic conductive element 134. In accordance with various aspects, the amount of the oxidizers created can be accelerated by decreasing a flowrate of the fluid 110 through the reaction chamber 130, for example, by reducing the flowrate up to about 95% of the initial flowrate or by increasing the voltage of the power source.

In accordance with various aspects of the present disclosure, the system 100 further comprises at least one solid capture system 160. For example, the solid capture system 160 may comprise secondary settling tanks, clarifiers, sieves, or weirs to remove additional insoluble destabilized mineral masses generated as a part of the electrochemical process. The fluid 110 that returns to the vessel 120 is thus reduced in hardness causing minerals, metals, and their alloys.

In accordance with various aspects of the present disclosure, the system 100 does not need scale control, such as phosphor-based inhibitors, that would otherwise be necessary in cooling systems, eliminating the risk of overfeeding or underfeeding the inhibitor into the fluid.

It will be apparent to those skilled in the art that various modifications and variations can be made in the present invention without departing from the spirit or scope of the invention. For example, numerous materials, shapes, sizes and configurations can be substituted in place of those described herein. Thus, the present invention covers the modifications and variations of this invention provided they come within the scope of the appended claims and their equivalents.

We claim:

1. A system for the removal of minerals from a conductive protonic fluid used for heat exchange in a cooling tower, comprising:
   a conductive protonic fluid flow mechanism;
   a DC power supply;
   at least two elongated elliptical reaction chambers for receiving the conductive protonic fluid operating in parallel, wherein each elongated elliptical reaction chamber has a length to major diameter ratio of between about 5:1 and about 10:1, and comprises:
   a reaction chamber wall, the reaction chamber wall having a conductive surface;

a single conductive element within and proximate a center of the reaction chamber;

wherein the conductive protonic fluid is supplied from a vessel to the elongated elliptical reaction chamber and back to the vessel by the conductive protonic fluid flow mechanism to form a continuous system;

wherein the DC power supply provides an electric field to the conductive protonic fluid in the elongated elliptical reaction chamber such that the conductive surface and the conductive element have opposing charges; and wherein the opposing charges separate the conductive protonic fluid into negative ions and positive ions creating an ion gradient of negative ions to positive ions between the conductive surface and the conductive element and resulting in an elliptical pH gradient between the conductive surface and the conductive element, thereby enhancing precipitation of the minerals on a positive end of the ion gradient;

a control mechanism for controlling at least one of the conductive protonic fluid flow mechanism and the DC power supply, wherein the conductive protonic fluid flow mechanism changes a flowrate of the conductive protonic fluid through the reaction chamber based on periodic monitoring of a Total Hardness Deficit of the conductive protonic fluid; and wherein the control mechanism monitors at least one of the Total Hardness Deficit and a silica deficit by performing a spectrometric analysis of a sample of the conductive protonic fluid during a predetermined interval of time by injecting the conductive protonic fluid with a colorant reactive to the minerals and then calculates at least one of the Total Hardness Deficit and the silica deficit using a 610 nm wavelength light.

2. A system for the removal of minerals from a conductive protonic fluid according to claim 1, further comprising at least one of a first manifold to separate and distribute the conductive protonic fluid into each elongated elliptical reaction chamber and a second manifold to combine the conductive protonic fluid leaving each elongated elliptical reaction chamber.

3. A system for the removal of minerals from a conductive protonic fluid according to claim 1, wherein a Reynolds number within each elongated elliptical reaction chamber is between about 20,000 and about 80,000.

4. A system for the removal of minerals from a conductive protonic fluid according to claim 1, wherein the reaction chamber has an internal surface area between about 615 $in^2$ and about 780 $in^2$.

5. A system for the removal of minerals from a conductive protonic fluid according to claim 1, wherein a radial distance between the conductive element and the conductive surface is between about 2 inches and about 4 inches.

6. A system for the removal of minerals from a conductive protonic fluid according to claim 1, wherein the ion gradient is negative proximate the single conductive element and positive proximate the conductive surface, and a pH of the conductive protonic fluid is about 0 proximate the single conductive element and greater than about 11 proximate the conductive surface.

7. A system for the removal of minerals from a conductive protonic fluid according to claim 1, wherein the control mechanism monitors the absolute value of the Total Hardness Deficit of the conductive protonic fluid and actively maintains the Total Hardness Deficit above about 5% by adjusting at least one of the following: a flow rate of the conductive protonic fluid through the reaction chamber, a voltage of the electric field, and a concentration of at least one hardness causing mineral.

8. A system for the removal of minerals from a conductive protonic fluid according to claim 1, wherein the control mechanism monitors a silica deficit of the conductive protonic fluid and actively maintains the silica deficit greater than about 5% by adjusting at least one of the following: a flow rate of the conductive protonic fluid into the reaction chamber, a voltage of the electric field, a concentration of silica in a source of the conductive protonic fluid.

9. A system for the removal of minerals from a conductive protonic fluid according to claim 1, wherein the control mechanism monitors an LSI of the conductive protonic fluid and maintains the LSI at about 1.0 when the electric field is active in the elongated elliptical reaction chamber by adjusting at least one of the following: temperature, a flow rate of the conductive protonic fluid into the reaction chamber, a voltage of the electric field, and a concentration of at least one hardness causing mineral.

10. A system for the removal of minerals from a conductive protonic fluid according to claim 1, wherein the control mechanism monitors an effective amperage applied across the electric field in the reaction chamber and maintains the effective amperage above about 1.0 Amperes by adjusting at least one of the following: (i) a voltage and (ii) a concentration of conductive minerals in the conductive protonic fluid by dilution or concentration in a source of the conductive protonic fluid.

11. A system for the removal of minerals from a conductive protonic fluid according to claim 1, wherein the conductive surface is a cathodic conductive surface and the single conductive element is an anodic conductive element.

12. A system for the removal of minerals from a conductive protonic fluid according to claim 11, wherein oxidizers are created in a region proximate the anodic conductive element.

13. A system for the removal of minerals from a conductive protonic fluid according to claim 12, wherein an amount of the oxidizers created is accelerated by decreasing the flowrate of the conductive protonic fluid through the reaction chamber to about 0-95% of an initial flow rate.

14. A system for the removal of minerals from a conductive protonic fluid according to claim 1, wherein the single conductive element is titanium.

15. A system for the removal of minerals from a conductive protonic fluid according to claim 1, wherein the single conductive element has a coating comprised of at least one of iridium, titanium, ruthenium, rhodium, palladium, and platinum.

16. A system for the removal of minerals from a conductive protonic fluid according to claim 1, wherein the flowrate of the conductive protonic fluid through the reaction chamber is at least about 10% of a flowrate of a net flow of the conductive protonic fluid into a source of the conductive protonic fluid.

17. A system for the removal of minerals from a conductive protonic fluid according to claim 1, wherein the conductive protonic fluid has a chloride level of greater than 150 ppm.

* * * * *